US000001862H

United States Statutory Invention Registration [19]

[11] Reg. Number: H1,862

Himes et al. [45] Published: Sep. 5, 2000

[54] HIGH SERVICE TEMPERATURE ADHESIVES AND SEALANTS MADE WITH HIGHLY FUNCTIONALIZED BLOCK COPOLYMERS

[75] Inventors: Glenn Roy Himes; Jeffrey George Southwick, both of Houston; David Michael Austgen, Jr., Missouri City, all of Tex.

[73] Assignee: Shell Oil Company, Houston, Tex.

[21] Appl. No.: 08/263,163

[22] Filed: Jun. 21, 1994

Related U.S. Application Data

[63] Continuation of application No. 08/073,366, Jun. 7, 1993, abandoned.

[51] Int. Cl.[7] ..... C08L 51/00

[52] U.S. Cl. ..... 525/75; 525/98; 525/285

[58] Field of Search ..... 525/75, 98, 285

[56] References Cited

U.S. PATENT DOCUMENTS

| | | | |
|---|---|---|---|
| H000758 | 4/1990 | Chin | 525/75 |
| 4,292,414 | 9/1981 | Saito et al. . | |
| 4,578,429 | 3/1986 | Gergen et al. . | |
| 4,927,889 | 5/1990 | Shiraki et al. . | |
| 4,994,508 | 2/1991 | Shiraki et al. . | |

FOREIGN PATENT DOCUMENTS

| | | |
|---|---|---|
| 0085115 | 2/1983 | European Pat. Off. . |
| 0299499 | 1/1989 | European Pat. Off. . |
| 0115345 | 9/1981 | Japan . |
| 0019377 | 2/1983 | Japan . |

OTHER PUBLICATIONS

S. H. Dillman and A. Sanders, Maleated Block Copolymers in Hot Melt Adhesives and Sealants, TAPPI Hot Melt Symposium, Atlanta, Ga., May 1989.

Encyclopedia of Polymer Science and Engineering J. Wiley & Sons, New York, 1987, V 7 pp. 808–810.

*Primary Examiner*—Peter A. Nelson

*Attorney, Agent, or Firm*—Donald F. Haas

[57] ABSTRACT

The present invention provides high service temperature sealant and adhesive compositions which contain a functionalized selectively hydrogenated block copolymer of a vinyl aromatic hydrocarbon and a conjugated diene to which has been grafted at least 4% by weight of an acid compound or its derivative wherein substantially all of the acid compound or its derivative is grafted to the block copolymer in the conjugated diene blocks. The present invention also contemplates a stable emulsion comprising the above polymer, water and less than 1 part per 100 of the emulsion of a surfactant.

6 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HIGH SERVICE TEMPERATURE ADHESIVES AND SEALANTS MADE WITH HIGHLY FUNCTIONALIZED BLOCK COPOLYMERS

This is a continuation of application Ser. No. 08/073,366, filed Jun. 7, 1993, and now abandoned.

BACKGROUND OF THE INVENTION

This invention relates to novel sealants and adhesives containing highly functionalized selectively hydrogenated block copolymer of vinyl aromatic hydrocarbons and conjugated dienes. More particularly, it relates to sealants and adhesives having improved shear adhesion failure temperatures and slump resistance.

U.S. Pat. No. 4,578,429 describes selectively hydrogenated block copolymers modified with acid compounds or derivatives thereof. The patent describes making ABA block copolymers wherein the A blocks are vinyl aromatic hydrocarbons and the B blocks are conjugated dienes, selectively hydrogenating them to hydrogenate primarily the B blocks and then functionalizing them by free radical grafting with monomers containing functional groups or their derivatives such as carboxylic acid groups and their salts, anhydrides, esters, imide groups, amide groups, acid chloride and the like in addition to having at least one point of unsaturation in the monomer. The polymers produced are said to be thermally stable, have a low residual unsaturation, excellent in appearance characteristics, melt-flow characteristics and mechanical properties such as tensile strength and impact resistance, and have excellent transparency. The grafted polymers are said to contain from 0.02 to 20 weight percent of the grafted monomer.

Commercial products of this type have been available for several years. These commercial products contain slightly less than two percent maleic anhydride grafted on to a hydrogenated styrene butadiene styrene block copolymer. They have been proven to be useful in sealants and adhesives. However, sealants using such polymers have not been used successfully at high service temperatures such as 55–60° C. because the sealant has a tendency to fail under shear stress at that temperature. Sealants made from these polymers also have a tendency to slump unacceptably at elevated temperatures, e.g. 64–70° C. Thus, it would be advantageous to provide a functionalized selectively hydrogenated block copolymer having the advantages of the functionalized block copolymers described in U.S. Pat. No. 4,578,429 with the additional advantage of being useful at high service temperatures, i.e., up to 80° C.

Unfunctionalized selectively hydrogenated and unhydrogenated block copolymer of vinyl aromatic hydrocarbons and conjugated dienes have been proven to be difficult to emulsify. The aforementioned commercially available maleic anhydride functionalized block copolymers are much easier to emulsify but more than one part of a surfactant per 100 parts rubber is required. Since surfactants negatively affect the adhesive properties of such emulsions, it would advantageous to be able to provide a stable emulsion of a functionalized block copolymer which requires little or no surfactant.

SUMMARY OF THE INVENTION

In one aspect of the present invention, a high service temperature sealant composition is provided. This composition comprised 100 parts of a functionalized selectively hydrogenated block copolymer of a vinyl aromatic hydrocarbon and the conjugated diene to which has been grafted at least 4% by weight of an acid compound or its derivative wherein substantially all of the acid compound or is derivative is grafted to the block copolymer at the conjugated diene blocks; from 10 to 400 parts of a tackifying resin, from 0 to 150 parts of an endblock reinforcing resin, and from 0 to 150 parts of a plasticizing oil.

In another aspect of the invention, a high service temperature adhesive composition is provided. This composition comprises 100 parts of the block copolymer described above and 10 to 400 parts of tackifying resin, 0 to 150 parts of endblock reinforcing resin and 0 to 100 parts of a plasticizing oil.

A third aspect of the present invention is a stable emulsion which utilizes little or no surfactant. The emulsion comprises 100 parts of the block copolymer described above and less than one part of a surfactant.

An additional advantage of this invention is increased adhesion to polar surfaces due to the increase in the amount of functionality on the polymer.

DETAILED DESCRIPTION OF THE INVENTION

The block copolymers which may be utilized in the present invention are described in detail in U.S. Pat. No. 4,578,429 which is herein incorporated by reference. Generally, these block copolymers of conjugated dienes and vinyl aromatic hydrocarbons include any of those copolymers which exhibit elastomeric properties and those which have 1,2-microstructure contents prior to hydrogenation of from about 7% to about 100%. They may contain up to 60% by weight of the vinyl aromatic hydrocarbon and may be linear or radial (or star), symmetric or asymmetric in structure. Linear polymers may be diblock, triblock, or multiblock (i.e., $(A\text{-}B)_x$ where x=2 to about 5).

Conjugated dienes which may be utilized to prepare the polymers and copolymers are those having from 4 to 8 carbon atoms and include 1,3-butadiene, isoprene, and the like and mixtures of these and other conjugated dienes. The preferred conjugated diene is 1,3-butadiene. Vinyl aromatic hydrocarbons which may be utilized include styrene, alphamethylstyrene, and the like. The preferred vinyl aromatic hydrocarbon is styrene.

These block copolymers may be produced by any well known block polymerization or copolymerization (including sequential addition of monomer, incremental addition of monomer or coupling as illustrated in, for example, U.S. Pat. Nos. 3,251,905, 3,390,207, 3,598,887, and 4,219,627 which are herein incorporated by reference.) Tapered copolymer blocks can be incorporated in the block copolymer. The hydrogenation of these polymers and copolymers may be carried out by a variety of well established methods (including hydrogenation in the presence of group VIII catalysts such as nickel catalysts as described in U.S. Pat. Nos. 3,113,986 and 4,226,952, the disclosures of which are herein incorporated by reference). They may also be produced using a titanium catalyst such as described in U.S. Pat. No. 5,039,755 which is herein incorporated by reference.

As described in the aforementioned U.S. Pat. No. 4,578,429 which is herein incorporated by reference, in general, any materials having the ability to react with the base polymer in free radical initiated reactions are operable monomers for the purposes of this invention. These monomers must be capable of reacting with the base polymer in solution or in the melt by a free radical mechanism. The monomers may be polymerizable or non-polymerizable but preferred monomers are non-polymerizable or slowly polymerizable.

The monomers must be ethylenically unsaturated in order to take part in free radical reactions. The class of preferred monomers which will form graft polymers within the scope of this invention have one or more functional groups or their derivatives such as carboxylic acid groups and their salts, anhydrides, esters, imide groups, amide groups, acid chlorides, and the like in addition to at least one point of unsaturation. These functionalities can be subsequently reacted with other modifying materials to produce new functional groups on the polymer either simultaneously with the grafting or in a post modification reaction.

The preferred modifying monomers are unsaturated mono- and polycarboxylic-containing acids ($C_3$–$C_{10}$) with preferably at least one olefinic unsaturation, and anhydrides, salts, esters, ethers, amides, nitriles, thiols, thioacids, glycidyl, cyano, hydroxy, glycol, and other substituted derivatives from such acids. Specific examples of useful materials include maleic acid, fumaric acid, acrylic acid, glycidyl acrylate, hydroxyalkylmethacrylates, methacrylic acid, maleic anhydride, acrylonitrile and others described in the aforementioned U.S. Pat. No. 4,578,429. The preferred monomers are maleic anhydride, maleic acid, fumaric acid and their derivatives. It is well known in the art that these monomers do not polymerize easily.

The method of preparation of these graft block copolymers is described in detail in the aforementioned U.S. Pat. No. 4,578,429 which is herein incorporated by reference. The grafting reaction is initiated by a free radical initiator, the concentration of which preferably ranges from 0.01 to 1.0 weight percent, at temperatures of 75° C. to 350° C. The reaction typically takes place in a screw type extruder to mix and melt the reactants and to heat the reactant mixture to the desired reaction temperature. The molecular weights of these block copolymers generally range from 35,000 to 250,000 wherein the vinyl aromatic hydrocarbon blocks have a molecular weight from 4,000 to 40,000 and the conjugated diene blocks have a molecular weight of from 25,000 to 220,000. It is critical to achieving the advantages of the present invention that at least 4% by weight of the acid compound or its derivative be grafted on the polymer. If less than 4% is grafted onto the polymer, then the sealants and adhesives made with the polymer will not have the desired high service temperature characteristics nor will they be easily emulsified with little or no surfactant.

Molecular weights of linear polymers or unassembled linear segments of polymers such as mono-, di-, triblock, etc., arms of star polymers before coupling are conveniently measured by Gel Permeation Chromatography (GPC), where the GPC systems has been appropriately calibrated. For polymers of the type described herein, the appropriate standard is a narrow molecular weight polystyrene standard. For anionically polymerized linear polymers, the polymer is essentially monodisperse and it is usually both convenient and adequately descriptive to report the "peak" molecular weight, the molecular weight of the main species shown on the chromatograph. For materials to be used in the columns of the GPC, styrene-divinyl benzene gels or silica gels are commonly used and are excellent materials. Tetrahydrofuran is an excellent solvent for polymers of the type described herein. Ultraviolet or refractive index detectors may be used.

Measurement of the true molecular weight of a coupled star polymer is not as straightforward or as easy to make using GPC. This is because the star shaped molecules do not separate and elute through the packed GPC columns in the same manner as do the linear polymers used for the calibration. Hence, the time of arrival at an ultraviolet or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle, polymer concentration and polymer size using standard procedures. The differential refractive index (DRI) of the sample is measured at the same wave length and in the same solvent used for the light scattering. The following references are herein incorporated by reference:

1. Modern Size-*Exclusion Liquid Chromatography*, M. W. Yau, J. J. Kirkland, D. D. Bly, John Wiley and Sons, New York, N.Y., 1979.
2. Light Scattering From Polymer Solutions, M. B. Huglin, ed., Academic Press, New York, N.Y., 1972.
3. W. K. Jai and A. J. Havlik, *Applied Optics*, 12 451 (1973).
4. M. L. McConnell, *American Laboratory*, 63, May, 1978.

*Resin*

In adhesives and sealants, it may be necessary to add an adhesion promoting or tackifying resin that is compatible with the polymer. A common tackifying resin is a diene-olefin copolymer of piperylene and 2-methyl-2-butene having a softening point of about 95° C. This resin is available commercially under the tradename Wingtack® and is prepared by the cationic polymerization of 60% piperylene, 10% isoprene, 5% cyclopentadiene, 15% 2-methyl-2-butene and about 10% dimer, as taught in U.S. Pat. No. 3,577,398. Other tackifying resins may be employed wherein the resinous copolymer comprises 20-80 weight percent of piperylene and 80-20 weight percent of 2-methyl-2-butene. The resins normally have softening points (ring and ball) between about 80° C. and about 115° C.

Other adhesion promoting resins which are also useful in the compositions of this invention include hydrogenated rosins, esters of rosins, polyterpenes, terpenephenol resins and polymerized mixed olefins, lower softening point resins and liquid resins. An example of a liquid resin is Adtac® LV resin from Hercules. To obtain good thermo-oxidative and color stability, it is preferred that the tackifying resin be a saturated resin, e.g., a hydrogenated dicyclopentadiene resin such as Escorez® 5000 series resin made by Exxon or a hydrogenated polystyrene or polyalphamethylstyrene resin such as Regalrez® resin made by Hercules.

The amount of adhesion promoting resin employed varies from about 10 to about 400 parts by weight per hundred parts rubber (phr), preferably between about 20 to about 150 phr. The selection of the particular tackifying agent is, in large part, dependent upon the specific polymer employed in the respective composition.

In addition to adhesion-promoting resins, polyolefin thermoplastics such as polybutene and polypropylkene may be incorporated into hot melt sealants. They modify viscosity and reinforce and stiffen the final product. In general, they reduce tack and adhesion properties. Polyolefins are used at 0 and 150 phr in the formulation.

Endblock Resin

Aromatic resins may be employed, provided that they are compatible with the particular polymer used in the formulation. Normally, the resin should have a softening point above about 100° C., as determined by ASTM method E 28, using a ring and ball apparatus. Mixtures of aromatic resins having high and low softening points may also be used. Useful resins include coumaroneindene resins, polystyrene resins, vinyl toluene-alphamethylstyrene copolymers, and polyindene resins. The amount of aromatic endblock resin varies from 0 to about 150 phr.

Plasticizer

The compositions of the instant invention may contain plasticizers, such as rubber extending plasticizers, or compounding oils. Rubber compounding oils are well-known in the art and include both high saturates content oils and high aromatics content oils. Preferred plasticizers are highly saturated oils, e.g. Tufflo® 6204 oil made by Arco and process oils, e.g. Shellflex® 371 oil made by Shell. The amounts of rubber compounding oil employed in the invention composition can vary from 0 to about 150 phr, preferably between about 0 to about 100 phr, and most preferably between about 0 and about 60 phr.

Filler

Various types of fillers and pigments can be included in the formulation. This is especially true for exterior sealants in which fillers are added not only to create the desired appeal but also to improve the performance of the sealant such as its weatherability. Some fillers, e.g., fumed silica, add to the thixotropic behavior of sealants. A wide variety of fillers can be used. Suitable fillers include calcium carbonate, clays, talcs, zinc oxide, titanium dioxide and the like. The amount of filler usually is in the range of 0 to about 65% based on the solvent free portion of the formulation, depending on the type of filler used and the application for which the formulation is intended. An especially preferred filler is titanium dioxide.

Solvent

If the formulation will be applied from solvent solution, the organic portion of the formulation will be dissolved in a solvent or blend of solvents. Aromatic hydrocarbon solvents such as toluene, xylene, or Shell Cyclo Sol 53 are suitable. Aliphatic hydrocarbon solvents such as hexane, naphtha or minerals spirits may also be used. If desired, a solvent blend consisting of a hydrocarbon solvent with a polar solvent can be used. Suitable polar solvents include esters such as isopropyl acetate, ketones such as methyl isobutyl ketone, and alcohols such as isopropyl alcohol. The amount of polar solvent used depends on the particular polar solvent chosen and on the structure of the particular polymer used in the formulation. Usually, the amount of polar solvent used is between 0 and 50%w in the solvent blend.

Stabilizer

Antioxidants and UV Inhibitors can be added to the formulations to protect the products against degradation by oxidation or by exposure to sunlight during preparation and use of the compositions. Combinations of stabilizers are often more effective, due to the different mechanisms of degradation to which various polymers are subject.

Emulsions of these polymers are formed by any of the well known techniques for forming emulsions from such polymers. For example, a polymer cement of the polymer in a solvent for the polymer may be combined with alkaline water or an alkaline aqueous solution of the surfactant. Preferably, the polymer cement is added to the aqueous phase while the aqueous phase is being vigorously mixed; forming the emulsion. The excess water and solvent are removed, leaving a stable emulsion. Little or no surfactant may be used to form this stable emulsion—less than 1 weight percent and often 0 weight percent of the surfactant are required. This is important since surfactants can adversely effect the adhesive characteristics of the emulsion. The surfactants which may be used include any of the well known cationic, anionic or nonionic surfactants including sodium dodecyl sulfate, sodium dodecyl-benzene sulfonate, etc.

EXAMPLE 1

Conventional SEBS-1 is a hydrogenated styrene-butadiene-styrene block copolymer having a molecular weight of about 50,000 and a styrene content of about 30. SEBS-2 is a hydrogeneated styrene-butadiene-styrene block copolymer having a molecular weight of about 47,500, a styrene content of about 30% and a diblock content of about 70%. The conventional maleated polymer was made by free radical grafting of maleic anhydride onto conventional SEBS-1 in a twin screw extruder according to the process described in U.S. Pat. No. 4,578,429 with the exception that the polymer was added first and melted and then the maleic anhydride was added and, finally, the peroxide was added. The final polymer contained 1.7 weight percent bound maleic anhydride. The highly maleated polymer was produced in a similar fashion and contained 4.5 weight percent bound maleic anhydride. The properties of these polymer are set forth in Table I below.

TABLE I

POLYMER PROPERTIES

| | Conventional SEBS-1 | Conventional SEBS-2 | Conventional Maleated Polymer | Highly Maleated Polymer |
|---|---|---|---|---|
| Bound Maleic Anhydride, % | 0.0 | 0.0 | 1.7 | 4.5 |
| Free Maleic Anhydride, % | 0.0 | 0.0 | 0.3 | 0.4 |
| Loss of Triblock Polymer due to Grafting Reaction, % | — | — | 32 | 61 |
| Gel Content (retained on 400 mesh screen), ppm | 8 | 1 | 450 | 166 |

EXAMPLE 2

The four polymers described above were used to make sealant compositions which were then tested for a variety of properties. The four sealant compositions, RO87, RO88, RO89, RO90, are described in Table II below. The hydrogenated tackifying resin used was a low molecular weight liquid hydrocarbon resin of 15–21° C. ring and ball (R&B) softening point. The endblock compatible reinforcing resin was a low molecular weight resin, copolymerized from aromatic monomers, which has a R&B softening point of 156–163° C.

TABLE II

SEALANT COMPOSITIONS

| Composition Number | R087 | R088 | R089 | R090 |
|---|---|---|---|---|
| Conventional SEBS-1 | 100.0 | — | — | — |
| Conventional SEBS-2 | — | 100.0 | — | — |
| Conventional Maleated Polymer | — | — | 100.0 | — |
| Highly Maleated Polymer | — | — | — | 100.0 |
| Hydrogenated Tackifying Resin | 270.0 | 270.0 | 270.0 | 270.0 |
| Endblock-compatible Reinforcing Resin | 50.0 | 50.0 | 50.0 | 50.0 |

TABLE II-continued

| SEALANT COMPOSITIONS | | | | |
|---|---|---|---|---|
| Composition Number | R087 | R088 | R089 | R090 |
| Hindered Phenol Antioxidant | 1.0 | 1.0 | 1.0 | 1.0 |
| UV Stabilizers | 2.5 | 2.5 | 2.5 | 2.5 |
| Total phr[1] | 423.5 | 423.5 | 423.5 | 423.5 |

[1]phr is parts per hundred rubber (polymer)

The four sealant compositions were then tested to determine their melt viscosity at 177° C., their shear adhesion failure temperature from an aluminum substrate, their slump temperature and their peel strength after one day and aged for seven days to a variety of substrates. The slump temperature is a measure of resistance of the sealant to gravitational pull on itself at gradually increasing temperatures under a set of standard conditions. These properties are set forth in Table III below.

TABLE III

PROPERTIES OF SEALANT COMPOSITIONS BASED ON FUNCTIONALIZED AND CONVENTIONAL BLOCK POLYMERS

| Composition Number | R087 | R088 | R089 | R090 |
|---|---|---|---|---|
| MELT VISCOSITY[1] AT 177° C. , cps | 2650 | 440 | 1770 | 5410 |
| SHEAR ADHESION FAILURE TEMPERATURE (SAFT)[2], ° C. (Aluminum substrate) | 56 | 44 | 57 | 65 |
| SLUMP TEMPERATURE[3], ° C. (>3/16 inch) | 65 | 55 | 70 | 80 |
| PEEL STRENGTH (180° C.)[4], pli | | | | |
| Aging Time[5], days. | | | | |
| Glass Substrate | | | | |
| 1 | 14a[6] | 14c | 42c | 36a |
| 7 | 10a | 13c | 44c | 58a/c |
| Annealed[7] 7 | 8a | 19c | 45a | —[8] |
| Aluminum Substrate | | | | |
| 1 | 4.7a | 16a | 15a | 17a |
| 7 | 4.0a | 14a/c | 11a | 11a |
| Annealed 7 | 13a | 16c | 55c | 51c |
| Nylon[9] Substrate | | | | |
| 1 | 12a | 10c | 39c | 68c |
| 7 | 40a/c | 14c | 60c | 83c |
| Annealed 7 | 27a | 23c | 65c | 78c |
| Steel Substrate | | | | |
| 1 | 15a | 14c | 43a | 17a |
| 7 | 16a | 15c | 47c/a | 21a |
| Annealed 7 | 14a | 22c | 45c | 46c |
| Poly(methylmethacrylate) Substrate | | | | |
| 1 | 55c | 11c | 41c | 52c |
| 7 | 50c | 10c | 40c | 45c |

TABLE III-continued

PROPERTIES OF SEALANT COMPOSITIONS BASED ON FUNCTIONALIZED AND CONVENTIONAL BLOCK POLYMERS

| Annealed | 7 | 31c | 7c | 30c | 35c |
|---|---|---|---|---|---|

[1]Brookfield Viscometer Model RVTD.
[2]0.5 lb load. Temperature ramped at 22 deg. C. per hour.
[3]Temperature at which sealant slumps >3/16 inch in a 0.5 × 1.0 × 1.0 inch cavity. Temperature ramped at 10 deg. C. per hour. Samples were conditioned at 23 deg. C. and 50% relative humidity for 24 hr prior to test.
[4]Specimens prepared by applying a sealant at 177 deg. C. to substrate at room temperature and immediately bonding the sealant to 1-inch wide canvas. Final sealant thickness, 1/16-inch. Canvas had been primed with a solution of styrene-ethylene/butylene-styrene and tackifying resin in toluene. Specimens were conditioned 4 hr. at 23 deg. C. and 50% rel. humidity prior to test. Peel rate, 2 inches/min.
[5]Time between bond formation and peel testing.
[6]a = adhesive failure at the sealant/substrate interface; c = cohesive failure of the sealant.
[7]These samples were aged for 4 days at room temperature, then 2.8 days (68 hr) at 60 deg. C., then 4 hours at 23 deg. C. and 50% rel. humidity before peel testing.
[8]Not tested.
[9]Nylon 6,6; Zytel 101, Dupont.

The highly maleated polymer (4.5% MA) underwent a markedly greater degree of degradation during the grafting reaction than the conventional maleated polymer (1.7% MA); i.e., 61% loss of the main triblock S-EB-S compared to 32%. In spite of this, the amount of gel produced was lower in the highly maleated polymer (166 ppm compared to 450 ppm).

In spite of the greater degradation undergone by the highly maleated polymer, it exhibited double the viscosity of Conventional SEBS-1 and an order of magnitude higher viscosity than Conventional SEBS-2. This factor, along with higher functionality, is thought to be responsible for the higher resistance to creep at elevated temperatures (manifested by the superior SAFT and Slump properties) of the compositions based on highly maleated polymer.

Adhesion to polar substrates generally increases with increasing polar functionality in the base polymer of a sealant or adhesive formulation. We believe this to be true in the instant invention. However, as seen in Table III, debonding on a variety of substrates occurred by cohesive failures in the sealant layer rather than adhesive failures at the sealant/substrate interface. Thus, the adhesive bond could not be directly measured. For the most part, the cohesive peel strengths of the highly maleated polymer were comparable or better than the values of the conventional maleated polymer. This indicates that the high MA grafting and high degradation surprisingly had little damaging effect on the cohesive strength of the polymer.

Aging and/or annealing of the sealant bond improved the bond strength in some cases; e.g., on aluminum and steel. The effect was more evident with maleated polymer. This phenomenon has been observed before with conventional functionalized polymers.

The primary benefits of high maleation in sealants, adhesives and many other applications are viscosity and strength enhancement, and improved creep resistance at elevated temperature.

In addition to these applications, enhancements in useful properties are contemplated in such areas as coatings, plastics modification and flexographic printing plates. For example, the highly maleated polymer would aid the adhesion of coatings to polar and other high energy surfaces. Similarly, the high maleation level would reduce interfacial tension in mixtures with (polar) engineering thermoplastics, enhancing polymer compatibility and improving expression of elastomeric character in the blend, e.g., impact resistance and flexibility. In flexographic printing plates, the easy water dispersibility of the highly maleated block copolymer would facilitate replacement of environmentally harmful solvents, while the functional groups on the polymer would provide sites for crosslinking.

EXAMPLE 3

A 20% solution of the 4.5% maleated SEBS-1 was prepared in a solvent system consisting of 85% ethyl acetate and 15% cyclohexane. This solution was added to water and subjected to shear and cavitation forces induced by a sonic horn. In all cases the water contained 0.068 moles of ammonia/gram of polymer in order to provide base to ionize the maleic acid groups along the polymer. Ionized acid groups are known to help stabilize polymer emulsion and dispersed particles in water by providing electrostatic repulsions between particles in the aqueous environment. Thus, the destabilizing influences of coagulation and coalescence of particles is retarded by the repulsions.

Either no surfactant, 0.1 phr, or 0.5 phr SDS (sodium dodecyl sulfate) was added to the water. phr is parts per hundred rubber and the rubber is the polymer. Table IV shows that initial particle sizes for the emulsion were 1.23, 1.05, and 0.7 microns, respectively. A clear phase was not formed in all cases which means that the emulsions were stable. Emulsions were successfully rotovaped to remove the ethyl acetate and cyclohexane resulting in polymer dispersions in water. These dispersions were also stable. No clear phases were noticed in any of the systems after rotovaping or up to 7 days storage of the dispersion. Some coagulum was formed in the dispersions as a result of rotovaping (removing the solvent while under vacuum) and more coagulum occurred during storage. These coagulum amounts are listed in the table. Coagulum arises from de-stabilized polymer particles which agglomerate forming clumps of rubber in the water. The greater amount of coagulum generated in the "no surfactant" dispersion shows that some small amount of surfactant is beneficial in stabilizing the dispersions. However, a successful dispersion was still formed in the absence of any surfactant.

TABLE IV

| Post Emulsification | | | | Post Rotovap | | | | |
|---|---|---|---|---|---|---|---|---|
| pH | Particle Size Microns | % Clear Phase | Time/ Days | pH | Particle Size Microns | % Clear Phase | % Solids | % Coagulum |
| 8.2 | 1.23 | 0 | 0 | 6.87 | | 0 | 31.6 | 0.47 |
| | | | 1 | | 0 | 30.9 | | |
| | | | 2 | | 1.33 | 0 | | |
| | | | 7 | | | 0 | 31.1 | 0.115 |
| 8.1 | 1.05 | 0 | 0 | 7.26 | | 0 | 16.9 | 0.039 |
| | | | 1 | | 0.961 | 0 | 16.9 | |
| | | | 7 | | | 0 | 16.9 | 0.034 |
| 8.5 | 0.7 | 0 | 0 | 7.35 | | 0 | 14.6 | 0.188 |
| | | | 1 | | 0.64 | 0 | 14.5 | |
| | | | 7 | | | 0 | 14.5 | 0.047 |

We claim:

1. A high service temperature sealant composition having a shear adhesion failure temperature of greater than 60° C. and a slump temperature of greater than 70° C. comprising:

(a) 100 parts of a functionalized selectively hydrogenated block copolymer of vinyl aromatic hydrocarbon and a conjugated diene to which has been grafted at least 4% by weight of an acid compound or an anhydride, salt, ester, imide, amide, ether, nitrile, acid chloride, thiol, thioacid, glycidyl, cyano, hydroxy, or glycol derivative thereof wherein substantially all of the acid compound or its derivative is grafted to the block copolymer in the conjugated dienes blocks, (b) 10 to 400 parts of a tackifying resin, (c) 0 to 150 parts of an endblock reinforcing resin, and (d) 0 to 150 parts of a plasticizing oil.

2. The sealant composition of claim 1 wherein the acid compound or its derivative is maleic anhydride.

3. A high service temperature adhesive composition having a shear adhesion failure temperature of greater than 60° C. and a slump temperature of greater than 70° comprising:

(a) 100 parts of a functionalized selectively hydrogenated block copolymer of vinyl aromatic hydrocarbon and a conjugated diene to which has been grafted at least 4% by weight of an acid compound or an anhydride, salt, ester, imide, amide, ether, nitrile, acid chloride, thiol, thioacid, glycidyl, cyano, hydroxy, or glycol derivative thereof wherein substantially all of the acid compound or its derivative is grafted to the block copolymer in the conjugated dienes blocks, (b) 10 to 400 parts of a tackifying resin, (c) 0 to 150 parts of an endblock reinforcing resin, and (d) 0 to 100 parts of a plasticizing oil.

4. The adhesive composition of claim 3 wherein the acid compound or its derivative is maleic anhydride.

5. A block copolymer emulsion which is stable for at least 7 days comprising:

(a) 100 parts of a functionalized selectively hydrogenated block copolymer of a vinyl aromatic hydrocarbon and a conjugated diene to which has been grafted at least 4% by weight of an acid compound or an anhydride, salt, ester, imide, amide, ether, nitrile, acid chloride, thiol, thioacid, glycidyl, cyano, hydroxy, or glycol derivative thereof wherein substantially all of the acid compound or its derivative is grafted to the block copolymer in the conjugated diene blocks, (d) water, and (c) less than 1 part per 100 parts of the emulsion of a surfactant.

6. The stable emulsion of claim 5 wherein the acid compound or its derivative is maleic anhydride.

* * * * *